No. 844,497. PATENTED FEB. 19, 1907.
E. H. CHEESBRO.
WATER PAN OR HOOD FOR GRINDSTONES.
APPLICATION FILED SEPT. 21, 1906.
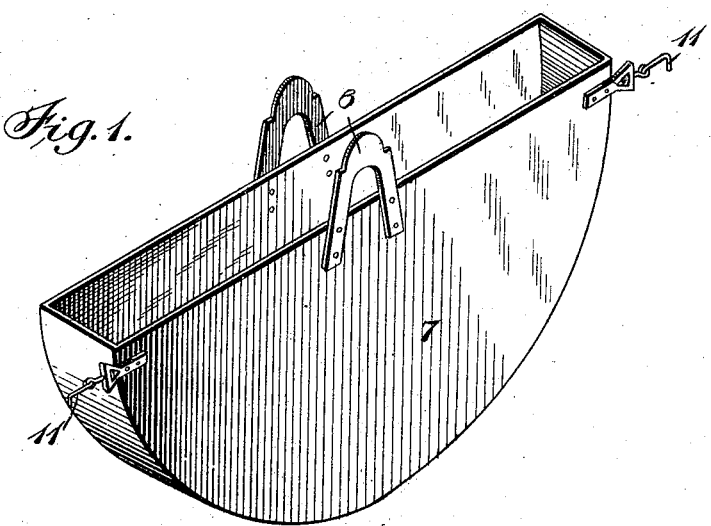
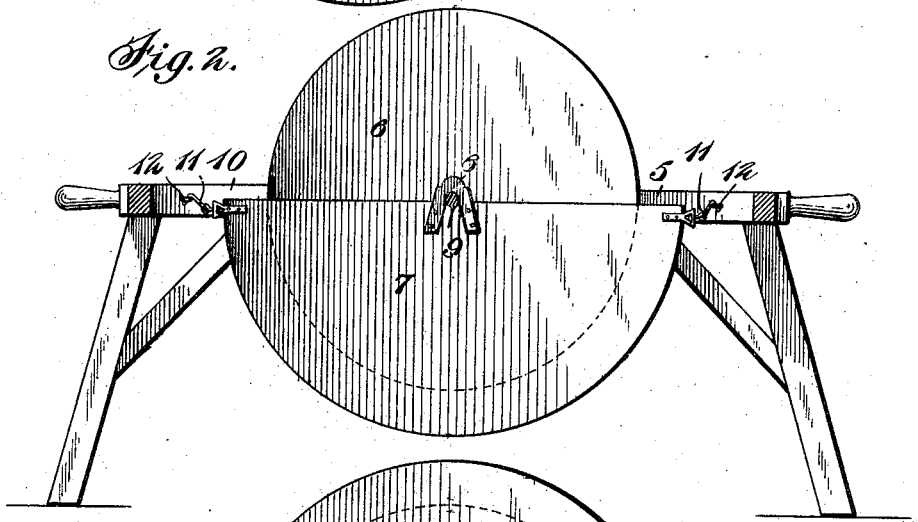
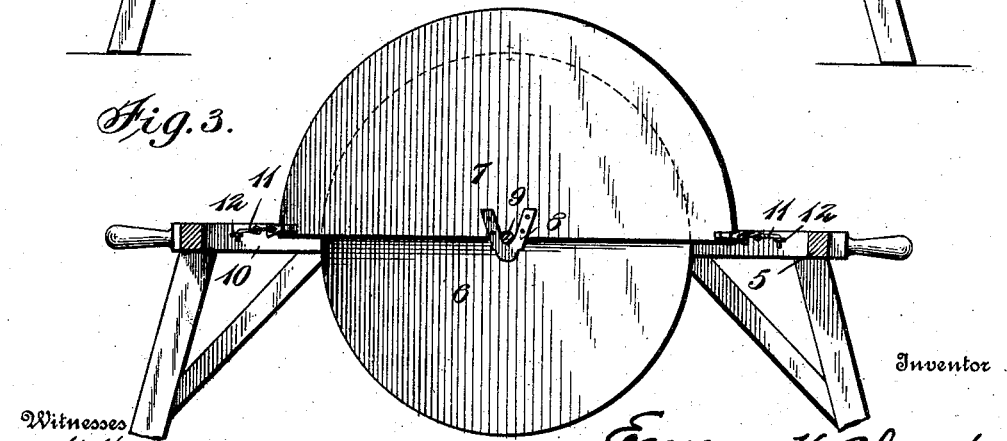

UNITED STATES PATENT OFFICE.

EMERY H. CHEESBRO, OF DANSVILLE, NEW YORK.

WATER PAN OR HOOD FOR GRINDSTONES.

No. 844,497.     Specification of Letters Patent.     Patented Feb. 19, 1907.

Application filed September 21, 1906. Serial No. 335,583.

*To all whom it may concern:*

Be it known that I, EMERY H. CHEESBRO, a citizen of the United States, residing at Dansville, in the county of Livingston and State of New York, have invented new and useful Improvements in a Water Pan or Hood, of which the following is a specification.

This invention is a water pan or hood for grindstones, and has for its object certain novel features of construction hereinafter described and claimed.

In the accompanying drawings, Figure 1 is a perspective view of the invention. Figs. 2 and 3 are longitudinal sectional views of the grindstone-frame, showing the application of the invention.

Referring specifically to the drawings, 5 denotes an ordinary grindstone-frame in which the grindstone 6 is mounted.

The invention comprises a semicircular trough 7, having on each side hangers 8, whereby it is hung on the shaft 9 of the stone between the side bars 10 of the frame 5.

When the device is to be used as a water-pan, it hangs downwardly, so as to inclose the lower half of the stone, as shown in Fig. 2. When the stone is not in use, the trough is swung around on the shaft 9 to cover the upper half of the stone, as shown in Fig. 3. The trough is held in either of these positions by swiveled hooks 11, secured to one of its sides and entering staples 12 on one of the side bars 10. The hooks prevent the trough from swinging when used as a water-pan, and when it is used as a hood or protector they hold it in position over the upper half of the stone.

The change from one position to the other can be readily made without removing the trough from the grindstone-shaft, and the device will be found handy and convenient and to effectively serve the purpose for which it is intended. The trough will be made in different sizes, and by raising or lowering the hangers 8 it can be fitted on larger or smaller shafts.

I claim—

The combination with a grindstone and its frame and shaft, of a water-pan hung on said shaft, and adjustable thereon to inclose the upper or lower half of the stone, and means for holding the pan in adjusted position.

In testimony whereof I have signed my name to this specification in the presence of two subscribing witnesses.

EMERY H. CHEESBRO.

Witnesses:
    GEO. D. L. BAILEY,
    JAMES A. BAILEY.